Figure 2:
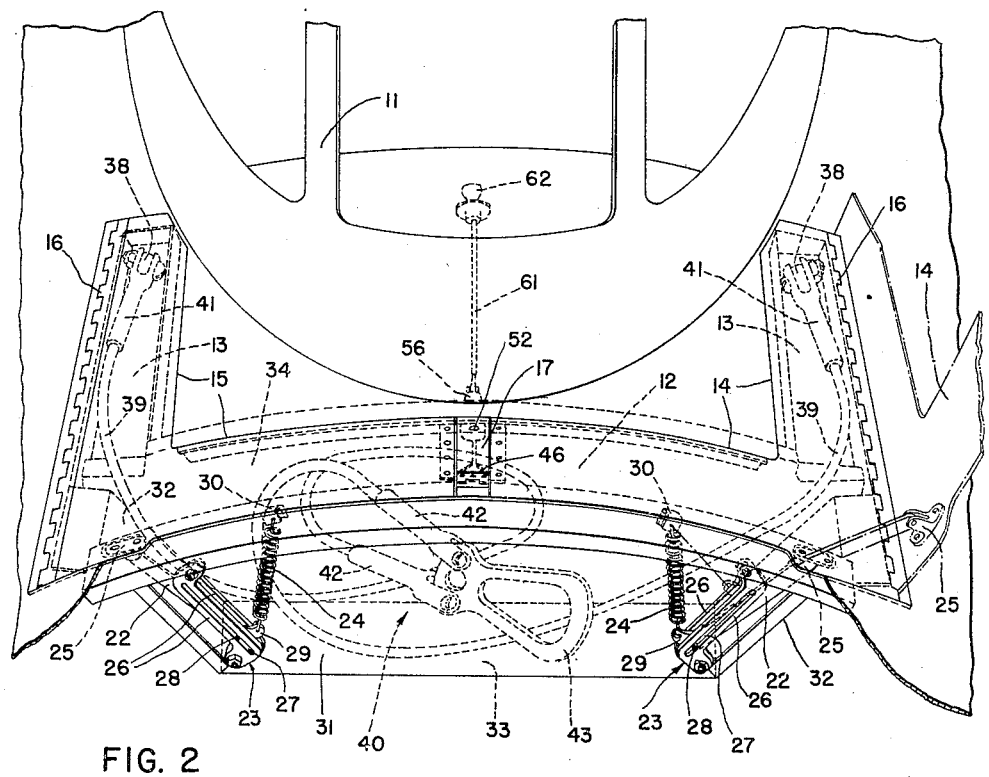

Dec. 6, 1949   J. J. HUTMACHER ET AL   2,490,521
HOISTING SLING ARRANGEMENT

Filed April 19, 1945   2 Sheets-Sheet 1

INVENTOR.
JOHN J. HUTMACHER
LOUIS G. RAICHE
BY George F. Goodyear
ATTORNEY

Dec. 6, 1949  J. J. HUTMACHER ET AL  2,490,521
HOISTING SLING ARRANGEMENT
Filed April 19, 1945  2 Sheets-Sheet 2
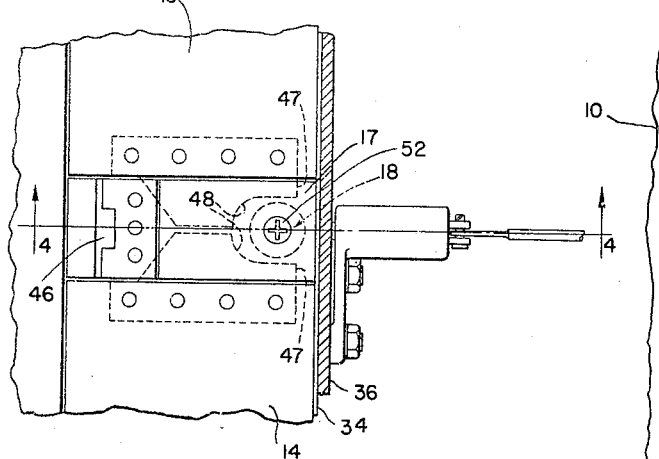
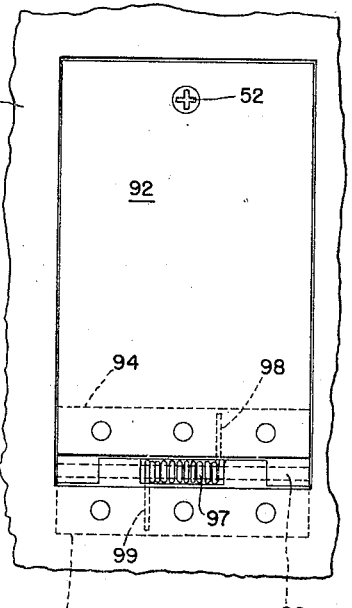
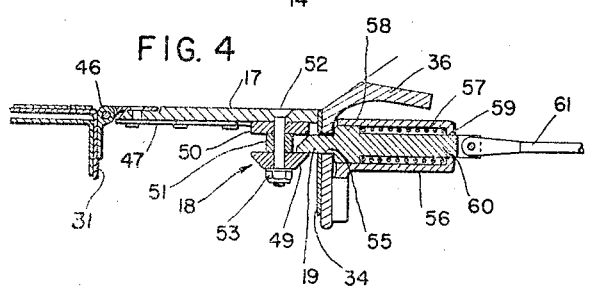
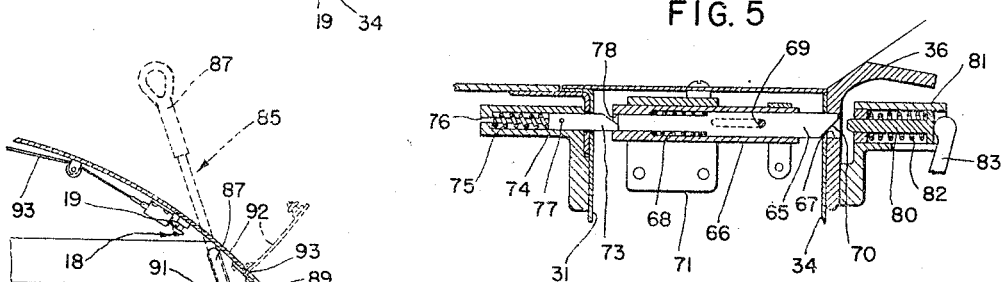
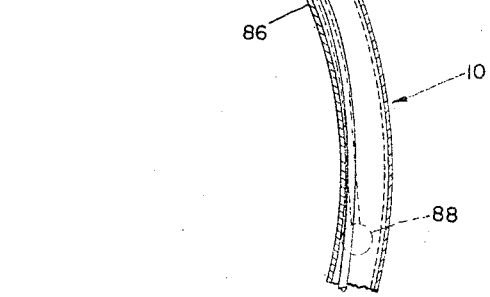
*INVENTOR.*
JOHN J. HUTMACHER
LOUIS G. RAICHE
BY George F. Goodyear
*ATTORNEY*

Patented Dec. 6, 1949

2,490,521

UNITED STATES PATENT OFFICE 2,490,521

HOISTING SLING ARRANGEMENT

John J. Hutmacher, Columbus, Ohio, and Louis G. Raiche, Williamsville, N. Y., assignors to Curtiss-Wright Corporation, a corporation of Delaware Application April 19, 1945, Serial No. 589,160

5 Claims. (Cl. 244—1)

This invention relates to hoist means and is particularly directed to hoist sling arrangements for aircraft use.

It is an object of the present invention to provide means and facilities in an aircraft for the installation of a hoist sling.

It is also a further object to construct and arrange a portion of the aircraft for stowage of the hoist sling whereby the same may be permanently installed.

Figure 1:
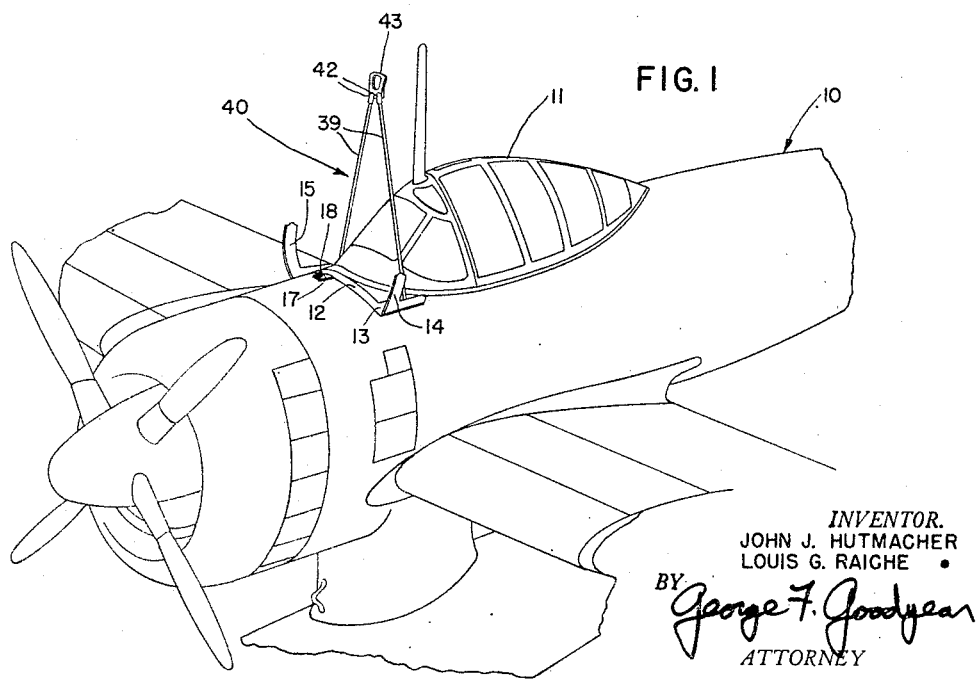

These and other objects will become evident as the description of this invention proceeds and in view of the disclosure thereof in the drawing in which:

Figure 1 is a fragmentary perspective view of only so much of the aircraft as will serve to illustrate the present invention, Figure 2 is a greatly enlarged but fragmentary view of the aircraft fuselage as constructed and arranged to receive the hoist sling, the view being taken from in front and above with the sling in stowed position, Figure 3 is an enlarged and fragmentary top plan view of a preferred latching arrangement, Figure 4 is a sectional elevation taken at line 4—4 in Figure 3, Figure 5 is a sectional elevation similar to that of the preceding view but illustrating a modified latching means, Figure 6 is a fragmentary transverse sectional elevation through an aircraft, the view showing a modification of a hoisting sling arrangement therefor, and Figure 7 is a plan view of the closure means utilized with the modified showing of Figure 6.

In the preferred arrangement of the present invention as shown in Figures 1 and 2, the aircraft 10, in the fuselage area just forward of the cockpit 11, is formed to provide a hoist sling stowage compartment comprising a central, transversely extending compartment section 12 and a pair of longitudinally rearwardly extending end compartment sections 13. The compartments are closed by a pair of cooperating cover means 14 and 15, each of which is hingedly mounted along the outer margin of the end sections 13, as at 16. The cover means are latched in closed position at a central location forward of the cockpit 11 and near the top surface of the fuselage by a latch plate 17 carrying a spool type catch element 18 which is engaged by a latch dog 19 later to be described in connection with Figures 3 and 4.

Each of the cover means 14 and 15 is provided with an actuator link 22 cooperating with a fixed, slotted guide 23 so that a resilient element or spring 24 may be utilized in the manner shown in right-hand portion of Figure 2 for urging the cover means to open position. These mechanisms are generally similar but are constructed and arranged for right and left-hand operation as is evident upon inspection. Specifically, each actuator link 22 at one end is pivoted to the respective cover means by a bracket element 25, the opposite end moving between side plate members 26 of the fixed guide 23. The link is constrained to move in the direction of the slots 27 formed in each member 26 by a transverse pin 28 which rides in these slots. The spring 24 is secured to the link at the projecting boss 29 thereon and to a bracket structure 30 on the forward wall 31, the latter constituting a part of the structure of the central compartment section 12.

The compartment section 12 is constituted by the front wall 31, above noted, and by suitable side walls 32, bottom partition 33 and rear wall structure 34 which also acts as the firewall separating the engine compartment from the pilots cockpit. Each of the lateral or end compartment sections 13, suitably constructed of sheet metal parts, extend rearwardly sufficiently far to include a structural rib member (not shown) which is located approximately at the lateral axis or axis of pitch of the aircraft.

Accordingly suitable swivel type anchor elements 38 fixed to the rib provide the connection means for the respective cable elements 39 of the hoist sling 40. Each of the elements 39 is provided at one end with an end fitting 41 for attachment to its respective anchor elements 38, the opposite end of each being attached by fitting 42 to a common hoist fitting 43 which is adapted to be engaged by a hoist line hook (not shown). This hoist sling 40 when in extended (full line) position (Figure 1) for hoisting the aircraft must be positioned to support the aircraft in a balanced or substantially level position. On the other hand, when not in use the same may be stowed in the compartment, as indicated by the dotted lines in Figure 2.

The cooperating cover means 14 and 15, hingedly mounted in the manner indicated, are adapted to be secured in closed position (Figure 2) by the latch plate 17. Accordingly, the plate 17 is hinged at 46 to the wall 31 and folds rearwardly into overlying engagement with tongue elements 47 suitably secured to each of the covers for that purpose (see Figures 3 and 4). Each of the elements 47 is notched at 48 so that the spool type catch 18 may pass therebetween. The element 18 is provided with a beveled cam disc 49 suitably spaced from a second disc element 50 by distance piece 51 and these parts are secured to the plate 17 by a countersunk bolt 52 and cooperating nut 53 as shown in Figure 4.

This catch 18 is adapted to engage the latch dog 19 which projects through an aperture 55 in the firewall 34 and adjacent structure 36 and lies in the path of movement of the catch. The dog 19 is slidably mounted in a barrel member 56 and is urged into latching position by the action of a spring 57, the latter engaging an enlarged annular guide means 58 on the dog and also the rear wall 59 of the barrel 56. The rearward body portion 60 of the latch dog extends through the barrel end wall 59 and is connected to an operating cable or other means 61 which extends rearwardly to a suitable handle element or knob 62 (Figure 2) positioned in the cockpit.

The action of the link guide and spring actuating mechanism for the cover means may be understood from the showing of Figure 2. For example, when it is desired to expose the hoist 40 for use, the pilot of the aircraft pulls back on knob 62 thus retracting the dog 19 against the spring 57 to release the spool catch 18. When this is accomplished the cover means are unrestrained and hence spring elements 24 (Figure 2) are free to urge the respective cover means to open position. Simultaneously with the opening action of the cover means, the latch plate 17 is automatically pivoted to open position (Figure 1) by its contact with the tongue elements 47, thus lifting the element 18 from between the tongues.

Manual manipulations for closing the compartment cover means are believed self evident from what has been said above concerning the operation of the several parts and elements associated therewith.

The modified latch construction of Figure 5 includes a slidably mounted dog element 65 supported in a barrel member 66 and urged into latching engagement within a suitable aperture 67 in firewall 34 and adjacent structure 36 by a spring 68. The dog is limited in its movement by a transverse stop pin 69 operable in slots formed in the barrel 66, only one such slot being shown in dotted outline in this view. The projecting end face of the dog 65 is beveled at 70 so as to be self-operating for latching the cover means. A suitable support bracket 71 mounts this latch means on one of the cover means and the other cover means is then arranged to be overlapped by the said one cover means so that the latter will act to secure both of the covers in closed position.

A second latch dog 73, urged outwardly of a barrel mount 74 by a coil spring 75 to the limits of the slot 76 in which a stop pin 77 is movable, is adapted to engage within the rear portion 78 of the barrel structure 66 in the path of movement of the dog 65. This second latch dog extends through the wall 31 and serves to hold the adjacent end of the barrel 66 against upward movement.

Operation of the modified latching mechanism is effected by a releasing pin 80 slidably carried in a housing 81 and held in retracted position by a spring 82. The pin 80 is located in axial alignment with the latch dog 65 and the latter is in axial alignment with the second latch dog 73. Thus when the pilot operates the actuating lever 83, by any suitable means not shown, but similar to that for the preferred latch mechanism, the pin 80 will drive dog 65 out of engagement with the aperture 67 and simultaneously the movement of dog 65 will move dog 73 to release its connection with the portion 78 of the barrel 66. Thereafter, the cover means will be moved to full open position by the combined action of the link, guide and spring mechanism disclosed in Figure 2.

The modified hoisting sling construction disclosed in Figures 6 and 7 comprises a pair of separately stowable hoist sling elements or cables 85. Since this arrangement is symmetrical only one half of the installation is shown and the description relating to the portions shown should be understood as applicable to the portions not shown. The longitudinal location of the element 85 is at the fore and aft balance point or pitch axis of the aircraft and is disposed to move into and out of the interior space of a fuselage ring or channel member 86 as indicated. The hoist element includes an eye fitting 87 at its upper end and a ball anchor 88 at its lower end. The sling moves through a suitably formed anchor block 89 secured in the adjacent structure of the ring 86. The block is provided with a spherical seat 90 to receive the ball 88 when the sling is in hoisting position. The full line position indicated in Figure 6 shows the sling fully stowed with the fitting 87 rotated 90 degrees and pressed into the aperture 91 in the block 89 where it is held by frictional engagement. The access door 92 which is hingedly mounted at 93 is held in closed position (full line) by the latch 18 and latch dog 19 before described in detail in connection with Figures 3 and 4. The operating means is also identical with the previously described means except that in the modified showing of Figure 6 a cable extension 93 is utilized.

When the dog 19 is released by the pull in cable 93 the access door 92 is automatically opened by a spring actuated hinge construction generally indicated in Figure 7. Thus the cooperating hinge elements 94 and 95 secured by the pintle 96 are formed to permit the positionment of a torsion spring 97 on the pintle 96 in such a position that the operating end elements 98 and 99 contact the respective elements 94 and 95. This type of hinge and spring construction is generally well known and needs no further detailed description.

While the foregoing detailed description relates to a preferred arrangement of the present invention as well as certain modifications thereof, it should be understood that the same is given by way of example and in an instructive sense, limitations on the scope of the invention being defined in and by the claims hereto annexed.

What is claimed is:

1. In an aircraft adapted to be hoisted bodily from place to place, a fuselage having a compartment formed therein to open outwardly, said compartment being formed and arranged with laterally spaced, longitudinally extending sections and an interconnecting, laterally extending section therebetween, a pair of hoist sling elements, each having one end anchored in one of said first mentioned compartment sections with the effective anchorage point approximately above the lateral axis of the aircraft, while the opposite end of each thereof is interconnected for common support of the aircraft when the latter is hoisted, said pair of sling elements being stowable in said second mentioned compartment section, and a pair of cooperating compartment closure means, each of which is hingeably disposed respectively along a margin of one of said longitudinal compartment sections for folding movement to close said latter sections and said interconnecting section when said pair of hoist sling elements are stowed therein.

2. In an aircraft adapted to be hoisted bodily from place to place, a fuselage having a compartment therein to open outwardly, said compartment being formed and arranged with laterally spaced, longitudinally extending sections and an interconnecting, laterally extending section therebetween, a pair of hoist sling elements, each having one end anchored in one of said first mentioned compartment sections with the effective anchorage point approximately above the lateral axis of the aircraft while the opposite end of each thereof is interconnected for common support of the aircraft when the latter is hoisted, said pair of sling elements being stowable for the most part in said second mentioned compartment section, a pair of cooperating compartment closure means, each of which is hingeably disposed respectively along a margin of one of said longitudinal compartment sections for folding movement to close said latter sections and said interconnecting section when said pair of hoist sling elements are stowed therein, locking means for said closure means, and means automatically operative upon unlocking of said locking means for opening said closure means.

3. In an aircraft adapted to be hoisted bodily from place to place, a fuselage having a compartment formed therein to open outwardly, said compartment being formed and arranged with laterally spaced, longitudinally extending sections and an interconnecting, laterally extending section therebetween, a pair of hoist sling elements, each having one end anchored in one of said first mentioned compartment sections with the effective anchorage point approximately above the lateral axis of the aircraft while the opposite end of each thereof is interconnected for common support of the aircraft when the latter is hoisted, said pair of sling elements being stowable for the most part in said second mentioned compartment section, a pair of cooperating compartment closure means, each of which is hingeably disposed respectively along a margin of one of said longitudinal compartment sections for folding movement to close said latter sections and said interconnecting section when said pair of hoist sling elements are stowed therein, locking means for said closure means, and means automatically operative upon unlocking of said locking means for opening said closure means, said means including a pair of links connected one to each of said closure means, separate guide means for each said link and separate spring means operatively connected to each said link for urging the same in a direction to open said closure means associated therewith.

4. In combination, an aircraft body having a canopy overlying the center of gravity of the aircraft, said body being provided with an upwardly opening compartment having a section on each side of the canopy and an interconnecting section adjacent one end of the canopy and spaced longitudinally from said center of gravity, a pair of hoisting sling elements each of which has one end anchored in one of the first mentioned compartment sections, the effective anchorage point being above and substantially aligned vertically with the transverse axis of the aircraft extending through said center of gravity, and the opposite ends of said sling elements being interconnected for common support of the aircraft when the latter is being hoisted and also for stowage in the compartment when they are not in use.

5. In combination, an aircraft body having a component extending upwardly therefrom and overlying the center of gravity of the aircraft, said body being provided with an upwardly opening compartment having a section on each side of said component and an interconnecting section adjacent one end of said component and spaced longitudinally from said center of gravity, a pair of hoisting sling elements each of which has one end anchored in one of the first mentioned compartment sections, the effective anchorage point being above and substantially aligned vertically with the transverse axis of the aircraft extending through said center of gravity, the opposite ends of said sling elements being interconnected for common support of the aircraft when the latter is being hoisted and also for stowage in the compartment when they are not in use, closure means for said compartment, and means for releasably securing said closure means to said body in closing relation to said compartment.

JOHN J. HUTMACHER.
LOUIS G. RAICHE.

REFERENCES CITED

The following references are of record in the file of this patent:

UNITED STATES PATENTS

| Number | Name | Date |
| --- | --- | --- |
| 1,351,764 | Kleckler | Sept. 7, 1920 |
| 1,677,638 | Jost | July 17, 1928 |
| 1,806,403 | Lyles | May 19, 1931 |
| 2,218,370 | Hajnowski | Oct. 15, 1940 |
| 2,264,321 | Manson | Dec. 2, 1941 |
| 2,338,030 | Edgemond | Dec. 28, 1943 |

FOREIGN PATENTS

| Number | Country | Date |
| --- | --- | --- |
| 417,813 | Great Britain | Oct. 12, 1934 |